United States Patent
Zhang et al.

(10) Patent No.: US 10,667,208 B2
(45) Date of Patent: May 26, 2020

(54) COMMUNICATION METHOD AND DEVICE

(71) Applicant: Huawei Technologies Co., Ltd., Shenzhen (CN)

(72) Inventors: Lili Zhang, Beijing (CN); Richard Stirling-Gallacher, Munich (DE); Bin Liu, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 15/780,179

(22) PCT Filed: Dec. 23, 2015

(86) PCT No.: PCT/CN2015/098455
§ 371 (c)(1),
(2) Date: May 30, 2018

(87) PCT Pub. No.: WO2017/107104
PCT Pub. Date: Jun. 29, 2017

(65) Prior Publication Data
US 2018/0352507 A1  Dec. 6, 2018

(51) Int. Cl.
*H04W 48/20* (2009.01)
*H04W 28/02* (2009.01)
(Continued)

(52) U.S. Cl.
CPC ....... *H04W 48/20* (2013.01); *H04W 28/0215* (2013.01); *H04W 28/08* (2013.01);
(Continued)

(58) Field of Classification Search
CPC ......... H04W 28/0215; H04W 28/0236; H04W 28/08; H04W 48/20; H04W 52/0206; H04W 52/16
See application file for complete search history.

(56) References Cited

U.S. PATENT DOCUMENTS 8,270,374 B2 * 9/2012 Cai .................. H04W 36/0058
  370/332
9,072,000 B2 * 6/2015 Tavildar ................ H04W 48/08
(Continued)

FOREIGN PATENT DOCUMENTS

CN  102077659 A  5/2011
CN  102281598 A  12/2011
(Continued)

OTHER PUBLICATIONS

Machine Translation and Abstract of Chinese Publication No. CN102077659, May 25, 2011, 26 pages.
(Continued)

*Primary Examiner* — Ahmed Elallam
(74) *Attorney, Agent, or Firm* — Conley Rose, P.C.

(57) ABSTRACT

A communication method, including receiving, by user equipment (UE), information about one or more backhaul links that is broadcast by different micro base stations, selecting, by the UE, a micro base station corresponding to backhaul link information that meets a preset condition, and accessing, by the UE, the selected micro base station when the selected micro base station is in an active state, or when the selected micro base station is in an inactive state, sending, by the UE, an activation signal to the selected micro base station, and accessing, by the UE, the selected micro base station after the micro base station is activated. Hence, a backhaul link can be used appropriately.

20 Claims, 5 Drawing Sheets

(51) Int. Cl.
*H04W 52/16* (2009.01)
*H04W 52/02* (2009.01)
*H04W 28/08* (2009.01)

(52) U.S. Cl.
CPC ....... *H04W 52/0206* (2013.01); *H04W 52/16* (2013.01); *H04W 28/0236* (2013.01)

(56) References Cited

U.S. PATENT DOCUMENTS

| | | | |
|---|---|---|---|
| 10,218,489 B2* | 2/2019 | Hessler | H04L 27/2646 |
| 2007/0010271 A1* | 1/2007 | Roy | H04W 24/00 |
| | | | 455/517 |
| 2010/0002614 A1 | 1/2010 | Subrahmanya | |
| 2012/0058765 A1 | 3/2012 | Choi | |
| 2012/0230224 A1* | 9/2012 | Aminaka | H04L 5/001 |
| | | | 370/255 |
| 2012/0327794 A1 | 12/2012 | Han et al. | |
| 2013/0021962 A1 | 1/2013 | Hu et al. | |
| 2013/0194989 A1 | 8/2013 | Centonza et al. | |
| 2013/0250908 A1 | 9/2013 | Bach et al. | |
| 2013/0343261 A1* | 12/2013 | Gonsa | H04B 7/2606 |
| | | | 370/315 |
| 2014/0247811 A1 | 9/2014 | Singh et al. | |
| 2015/0189589 A1 | 7/2015 | Legg et al. | |
| 2015/0312768 A1 | 10/2015 | Tokgoz | |
| 2016/0286482 A1 | 9/2016 | Zheng et al. | |

FOREIGN PATENT DOCUMENTS

| | | |
|---|---|---|
| CN | 102415125 A | 4/2012 |
| CN | 103327550 A | 9/2013 |
| CN | 103533576 A | 1/2014 |
| CN | 103841574 A | 6/2014 |
| CN | 104105159 A | 10/2014 |
| CN | 104735752 A | 6/2015 |
| EP | 2879425 A1 | 6/2015 |
| WO | 2013110213 A1 | 8/2013 |
| WO | 2013139611 A1 | 9/2013 |
| WO | 2013166371 A1 | 11/2013 |
| WO | 2014032733 A1 | 3/2014 |
| WO | 2014040642 A1 | 3/2014 |
| WO | 2014040643 A1 | 3/2014 |
| WO | 2014086035 A1 | 6/2014 |
| WO | 2014090283 A1 | 6/2014 |
| WO | 2014137944 A2 | 9/2014 |
| WO | 2015053685 A1 | 4/2015 |
| WO | 2015081531 A1 | 6/2015 |

OTHER PUBLICATIONS

Machine Translation and Abstract of Chinese Publication No. CN104105159, Oct. 15, 2014, 51 pages.
Machine Translation and Abstract of Chinese Publication No. CN104735752, Jun. 24, 2015, 17 pages.
Foreign Communication From a Counterpart Application, Chinese Application No. 201580078825.8, Chinese Office Action dated Jul. 2, 2019, 11 pages.
"3rd Generation Partnership Project; Technical Specification Group Radio Access Network; Evolved Universal Terrestrial Radio Access (E-UTRA); Potential solutions for energy saving for E-UTRAN (Release 10)," 3GPP TR 36.927 V10.1.0, Sep. 2011, 22 pages.
Ericsson, et al.,"Extended cell DTX for enhanced energy-efficient network operation," R1-095011, 3GPP TSG-RAN WG1 #59, Nov. 9-13, 2009, 6 pages.
Frenger, P., et al.,"Reducing Energy Consumption in LTE with Cell DTX," Ericsson Research, 2011, 5 pages.
Foreign Communication From a Counterpart Application, PCT Application No. PCT/CN2015/098455, English Translation of International Search Report dated Sep. 21, 2016, 2 pages.
Machine Translation and Abstract of Chinese Publication No. CN103533576, Jan. 22, 2014, 25 pages.
Machine Translation and Abstract of Chinese Publication No. CN103841574, Jun. 4, 2014, 20 pages.
Machine Translation and Abstract of Chinese Publication No. CN103327550, Sep. 25, 2013, 25 pages.
Machine Translation and Abstract of Chinese Publication No. CN102281598, Dec. 14, 2011, 13 pages.
Research in Motion, UK Limited, "Serving Cell Selection in a Type 1 Relay Network," R2-100409, 3GPP TSG RAN WG2 #68bis, Jan. 18-22, 2010, 3 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.9.0, XP050377584, Jun. 2009, 159 pages.
Mitsubishi Electric, "Dynamic Setup of HNBs for Energy Savings and Interference Reduction", 3GPP TSG RAN WG3 Meeting #61, R3-081949, Aug. 18-22, 2008, 7 pages.
Foreign Communication From a Counterpart Application, European Application No. 15911103.8, Extended European Search Report dated Aug. 6, 2018, 13 pages.

* cited by examiner

COMMUNICATION METHOD AND DEVICE

CROSS-REFERENCE TO RELATED APPLICATION

This application is a U.S. National Stage of International Patent Application No. PCT/CN2015/098455 filed on Dec. 23, 2015, which is hereby incorporated by reference in its entirety.

TECHNICAL FIELD

The present disclosure relates to the communications field, and in particular, to a communication method and a device.

BACKGROUND

Development of wireless technologies causes a user to require better wireless network communication experience. Deployment of a ultra-dense network (UDN) evolving to a small cell is considered as an important approach to data rate improvement and user communication experience enhancement of a wireless network. A UDN is relatively large. Although each small cell consumes relatively low energy, high-density deployment means an obvious increase in power consumption of the entire network. To save energy, a micro base station that has no task and that is in a small cell usually needs to enter an energy-saving state.

In a UDN, a small cell generally has a relatively small coverage area. Some small cells are not directly connected to a core network and need to transmit data by means of a relatively large quantity of wireless backhauls or fiber-optic backhauls. That is, these small cells generally do not communicate directly with the core network. Instead, micro base stations corresponding to the small cells transmit data to a donor micro base station by means of wireless backhaul. These micro base stations are generally connected to a macro base station using an optical fiber. Alternatively, the micro base stations transmit data to a macro base station using an optical fiber. The donor micro base station or the macro base station transmits the data to the core network. During this process, multiple micro base stations may need to be used to transmit the data to the core network.

If a backhaul service is fixed, there may be sufficient backhaul link resources. Actually, user behavior is changeable. Consequently, access service variations and a complex interference environment and channel status are caused, and a backhaul service is always changing. This further results in insufficiency of backhaul link resources. That is, backhaul tasks of some micro base stations reach or exceed bearable load, whereas some nearby micro base stations may have relatively few backhaul tasks. As a result, resources are not fully used, and data communication is affected. Therefore, how to use backhaul link resources more appropriately becomes a technical problem that urgently needs to be resolved by a person skilled in the art.

SUMMARY

Embodiments of the present disclosure provide a communication method and a device to use a backhaul link more appropriately.

According to an aspect, an embodiment of this application provides a communication method. The method is applicable to a UDN. The method includes receiving, by user equipment (UE), information about one or more backhaul links that is broadcast by different micro base stations, selecting, by the UE, a micro base station corresponding to backhaul link information that meets a preset condition, and when the selected micro base station is in an active state, accessing, by the UE, the selected micro base station, or when the selected micro base station is in an inactive state, sending, by the UE, an activation signal to the selected micro base station, and accessing, by the UE, the selected micro base station after the micro base station is activated. According to this embodiment of the present disclosure, a UE side can determine which micro base station is to be activated. This increases accuracy of link determining, reduces network energy consumption of a UDN, and improves user experience.

In a possible design, the information about the backhaul link may include at least one of a link type (for example, a wireless type or a fiber-optic type), a link status (for example, an intermediate transmission state or an end transmission state), a link level (for example, level-1 wireless backhaul or level-2 wireless backhaul), or information about acceptable load. According to this embodiment of the present disclosure, a backhaul link can be selected according to a link type, a link status, a link level, and other information. Therefore, selection is more appropriate, and user experience is improved.

In a possible design, the information about acceptable load may include strong acceptability, intermediate acceptability, weak acceptability, an acceptable load ratio, an occupied load ratio, or the like. According to this embodiment of the present disclosure, a load status of a backhaul link can be reflected more intuitively such that backhaul link selection is more accurate.

In a possible design, the information about the backhaul link may include information about an active link, and selecting, by the UE, backhaul link information that meets a preset condition includes selecting, by the UE, a first micro base station corresponding to information about an active link whose information about acceptable load reaches a threshold and whose delay is shortest. The delay may be determined according to a link type, a hop count, or other information about the link. According to this embodiment of the present disclosure, the UE can select an optimum active backhaul link to perform transmission of data of the UE, thereby improving user experience.

In a possible design, the information about the backhaul link may include information about an inactive link, and selecting, by the UE, backhaul link information that meets a preset condition includes selecting, by the UE, a second micro base station corresponding to information about an inactive link whose information about acceptable load reaches a threshold and whose delay is shortest. According to this embodiment of the present disclosure, the UE can select an optimum inactive backhaul link to perform transmission of data of the UE, thereby improving user experience.

In a possible design, the link information may include both information about an active link and information about an inactive link, and selecting, by the UE, backhaul link information that meets a preset condition includes selecting, by the UE, a first micro base station corresponding to information about an active link whose information about acceptable load reaches a threshold and whose delay is shortest when there is information that is about an active link and that meets the preset condition, or selecting, by the UE, a second micro base station corresponding to information about an inactive link whose information about acceptable load reaches a threshold and whose delay is shortest when the information about the active link does not meet the preset condition. According to the present disclosure, the following can be implemented. The UE preferentially selects an active link when the link information received by the UE includes both information about an active link and information about an inactive link. When no active link meets the condition, the UE selects an inactive link. Because some energy needs to be consumed to activate a micro base station, in this way, unnecessary energy consumption can be avoided as far as possible.

In a possible design, the activation signal may be used to indicate an activation time of the selected micro base station, information about a resource that is initially accessed, and the like. According to this embodiment of the present disclosure, the UE can activate the micro base station, and the micro base station can be activated at a specified time and implement access of the UE.

In a possible design, the activation signal may include at least one of a preamble, a serial number, a Code Division Multiple Access (CDMA) code, a reference signal, a sounding signal, or a physical cell identifier (ID) (PCI). The foregoing signal needs to be predefined as the activation signal such that the micro base station can identify the signal after receiving the signal. According to this embodiment of the present disclosure, the UE can activate the micro base station using any one of the foregoing signals, thereby making it possible for the UE to activate the micro base station. In addition, the UE can activate only the specific base station, thereby reducing energy consumed for activating an unnecessary base station.

In a possible design, the activation signal may be a blind uplink beacon signal or a PCI. According to this embodiment of the present disclosure, the UE can activate the micro base station, and activate only the micro base station with the specific PCI, thereby reducing energy consumed for activating an unnecessary base station.

In a possible design, sending, by the UE, an activation signal to the selected micro base station includes estimating, by the UE, an uplink power according to a detected downlink signal power of a discovery reference signal that is broadcast by the selected micro base station and according to a threshold and/or an offset value that are/is predefined or that are/is notified of by the base station using signaling, where the discovery reference signal is a common reference signal (CRS) or a cell-specific reference signal (CSI-RS), and sending, by the UE, the activation signal to the selected micro base station using the estimated uplink power. According to this embodiment of the present disclosure, the UE can activate the micro base station, and activate only the micro base station with the specific uplink power, thereby reducing energy consumed for activating an unnecessary base station.

In a possible design, the selected micro base station may be connected to a macro base station, and sending, by the UE, an activation signal to the selected micro base station includes sending, by the UE, activation information to the macro base station when the UE is connected to the macro base station, where the activation information includes an identity of the selected micro base station such that the macro base station sends the activation signal to the selected micro base station. According to this embodiment of the present disclosure, the UE can activate the micro base station, and send the activation signal using the macro base station, thereby reducing resources occupied for using a specific activation signal.

In a possible design, sending, by the UE, an activation signal to the selected micro base station includes sending, by the UE, a preset activation signal to the base station group to which the selected micro base station belongs in order to activate the base station group when the selected micro base station belongs to a base station group. According to this embodiment of the present disclosure, the UE can activate the base station group. Even if a single micro base station cannot meet a condition of the UE, the base station group can meet the condition. In this way, value of this embodiment of the present disclosure in actual application is increased.

According to another aspect, an embodiment of this application provides a communication method. The method is applicable to a UDN. The method includes broadcasting, by a micro base station, backhaul link information, receiving, by the micro base station, an activation signal that is sent to the selected micro base station after UE selects the micro base station based on the backhaul link information when the micro base station is in an inactive state, entering, by the micro base station, an active state according to the activation signal, and performing, by the micro base station, access of the UE when the UE accesses the selected micro base station. According to this embodiment of the present disclosure, the UE can obtain the backhaul link information by receiving a broadcast or the like. In this way, it is possible to select, according to the backhaul link information, a proper backhaul link to perform data backhaul, and backhaul link allocation is more appropriate.

In a possible design, the broadcasting, by a micro base station, backhaul link information may include transmitting the backhaul link information alone in a form of broadcast information, or adding the backhaul link information to other broadcast information for transmission when the micro base station is in an active state, or transmitting the backhaul link information alone in a manner the same as a manner of broadcasting a discovery reference signal and in a period that is the same as or a multiple of a period in which the discovery signal is broadcast, or adding the backhaul link information to a discovery reference signal for transmission when the micro base station is in an inactive state. According to this embodiment of the present disclosure, the backhaul link information can be broadcast regardless of whether the base station is in the active state or the inactive state, and the backhaul link information can be broadcast more easily.

In a possible design, the micro base station corresponds to a parent base station, the parent base station corresponds to several child base stations, and information about acceptable load may be obtained by subtracting a total capacity of another active child base station from a total backhaul capacity of the parent base station. According to this embodiment of the present disclosure, the information about acceptable load of the micro base station can be calculated more accurately, an actual load status can be better reflected, and link selection is more appropriate.

In a possible design, the micro base station statistically calculates whether a backhaul capacity of the micro base station can satisfy a requirement of the UE. When the micro base station needs to provide a service for multiple UEs and the micro base station cannot simultaneously satisfy requirements of the multiple UEs, the micro base station sets a protection boundary according to a preset rule. According to this embodiment of the present disclosure, the information about acceptable load of the micro base station can be calculated more appropriately, and link selection is more appropriate.

According to still another aspect, an embodiment of this application provides a communication method, and the method is applicable to a UDN. The method includes receiving, by a macro base station, activation information that is sent by UE after the UE selects a micro base station based on backhaul link information that is broadcast by the micro base station, where the activation information includes an identity of the selected micro base station, and sending, by the macro base station, an activation signal to the selected micro base station based on the identity of the selected micro base station, where the activation signal is specific information and is used to indicate a working mode of the micro base station and the activation information. According to this embodiment of the present disclosure, the UE can activate the micro base station using the macro base station. Therefore, resources occupied for micro base station activation by the UE are reduced.

According to still another aspect, an embodiment of this application provides UE, where the device is applicable to a UDN. The device includes a receiver configured to receive information about one or more backhaul links, where the information about the one or more backhaul links is from different micro base stations, a processor configured to select a micro base station corresponding to backhaul link information that meets a preset condition, and a transmitter configured to send an activation signal to the selected micro base station when the selected micro base station is in an inactive state, where the processor is further configured to access the selected micro base station.

In a possible design, the information about the backhaul link includes information about an active link, and the processor may be further configured to select a first micro base station corresponding to information about an active link whose information about acceptable load reaches a threshold and whose delay is shortest.

In a possible design, the information about the backhaul link includes information about an inactive link, and the processor may be further configured to select a second micro base station corresponding to information about an inactive link whose information about acceptable load reaches a threshold and whose delay is shortest.

In a possible design, the link information includes information about an active link and information about an inactive link, and the processor may be further configured to select a second micro base station corresponding to information about an inactive link whose information about acceptable load reaches a threshold and whose delay is shortest when the information about the active link does not meet the preset condition.

In a possible design, the transmitter is further configured to estimate an uplink power according to a detected downlink signal power of a discovery reference signal that is broadcast by the selected micro base station and according to a threshold and/or an offset value that are/is predefined or that are/is notified of by the base station using signaling, where the discovery reference signal is a CRS or a CSI-RS, and send the activation signal to the selected micro base station using the uplink power.

In a possible design, the selected micro base station is connected to a macro base station, and the transmitter may be further configured to send activation information to the macro base station when the UE is connected to the macro base station, where the activation information includes an identity of the selected micro base station such that the macro base station sends the activation signal to the selected micro base station.

In a possible design, when the selected micro base station belongs to a base station group, the transmitter may be further configured to send a preset activation signal to the base station group to which the selected micro base station belongs in order to activate the base station group.

According to still another aspect, an embodiment of this application provides a micro base station, where the micro base station is applicable to a UDN. The micro base station includes a transmitter configured to broadcast backhaul link information, a processor configured to receive an activation signal that is sent to the micro base station after UE selects the micro base station based on the backhaul link information, and enter an active state according to the activation signal when the micro base station is in an inactive state, and an access unit configured to perform access of the UE when the UE accesses the selected micro base station.

In a possible design, when the micro base station is in an active state, the transmitter may be further configured to transmit the backhaul link information alone in a form of broadcast information, or add the backhaul link information to other broadcast information for transmission.

In a possible design, when the micro base station is in an inactive state, the transmitter may be further configured to transmit the backhaul link information alone in a manner the same as a manner of broadcasting a discovery reference signal and in a period that is the same as or a multiple of a period in which the discovery signal is broadcast, or add the backhaul link information to the discovery reference signal for transmission.

In a possible design, the micro base station corresponds to a parent base station, the parent base station corresponds to several child base stations, and information about acceptable load is obtained by subtracting a total capacity of another active child base station from a total backhaul capacity of the parent base station.

In a possible design, a protection boundary is set for the micro base station, and information about acceptable load is obtained by subtracting the protection boundary from actual acceptable load of the micro base station.

In a possible design, the processor may be further configured to statistically calculate, for the micro base station, whether a backhaul capacity of the micro base station can satisfy a requirement of the UE, and set, for the micro base station, the protection boundary according to a preset rule when the micro base station needs to provide a service for multiple UEs and the micro base station cannot simultaneously satisfy requirements of the multiple UEs.

According to still another aspect, an embodiment of this application provides a macro base station, where the macro base station is applicable to a UDN. The macro base station includes a receiver configured to receive activation information that is sent by UE after the UE selects a micro base station based on backhaul link information that is broadcast by the micro base station, where the activation information includes an identity of the selected micro base station, and a transmitter configured to send an activation signal to the selected micro base station based on the identity of the selected micro base station, where the activation signal is specific information and is used to indicate a working mode of the micro base station and the activation information.

According to still another aspect, an embodiment of the present disclosure provides a computer storage medium configured to store a computer software instruction used by the foregoing base station, where the computer software instruction includes a program that is designed for executing the foregoing aspects.

According to still another aspect, an embodiment of the present disclosure provides a computer storage medium configured to store a computer software instruction used by the foregoing UE, where the computer software instruction includes a program that is designed for executing the foregoing aspects.

Compared with other approaches, the solutions provided in the present disclosure can implement more flexible backhaul link allocation. In addition, the allocation is determined by the demand-side UE such that backhaul link allocation is more appropriate, user experience is improved, and energy consumption of a network-side system is reduced. In this way, a better balance between network energy consumption and user experience is achieved.

DESCRIPTION OF EMBODIMENTS

The following further describes in detail the technical solutions of the present disclosure with reference to the accompanying drawings and the embodiments.

To facilitate understanding of the embodiments of the present disclosure, the following provides further explanations and descriptions with reference to the accompanying drawings using specific embodiments. The embodiments do not constitute any limitation on the embodiments of the present disclosure.

Figure 1:
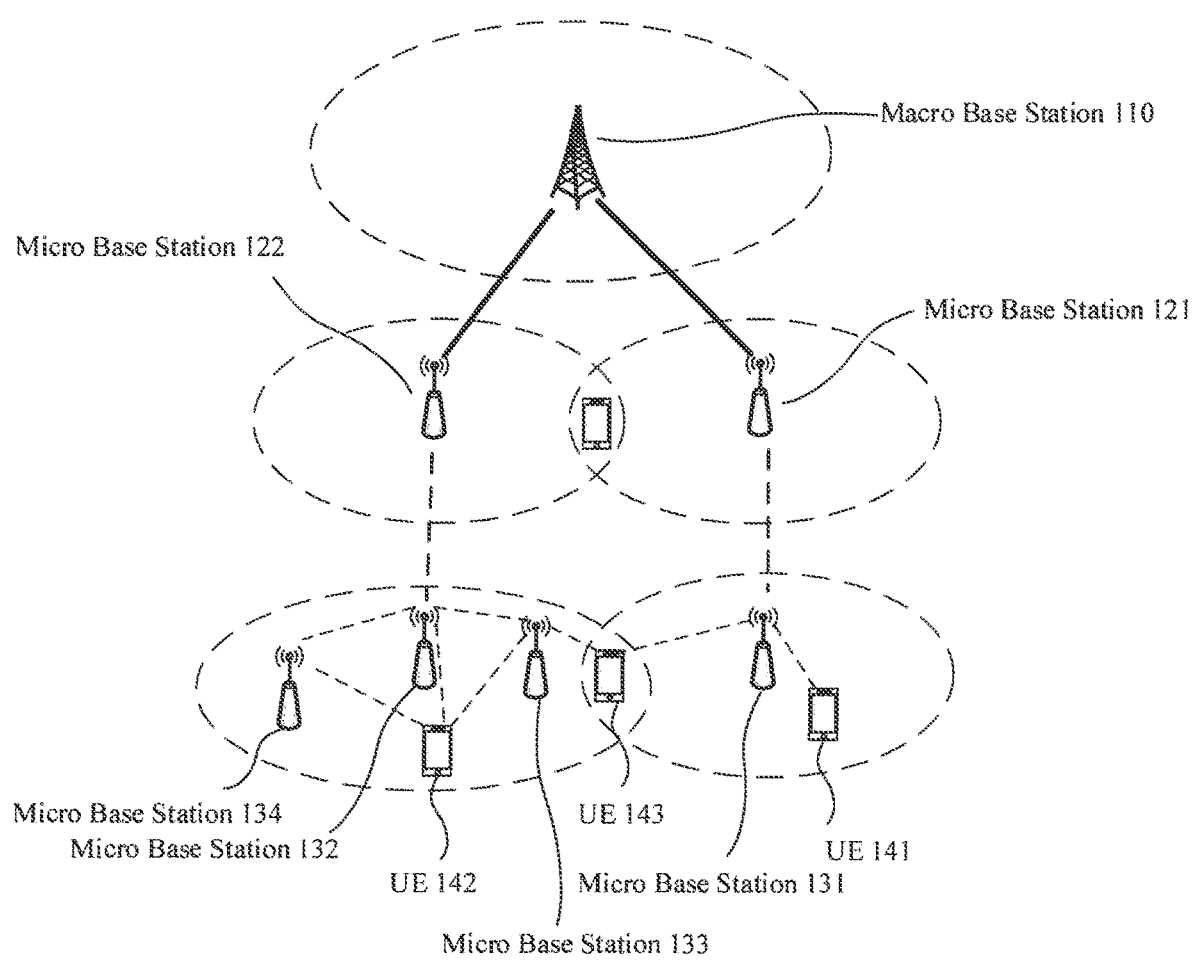
FIG. 1 is a schematic diagram of an application scenario according to an embodiment of the present disclosure.

As shown in FIG. 1, in a UDN network, UE may access the network using an access network device. For example, UE 141 may be connected to a macro base station 110 using a micro base station 131 and a micro base station 121, and further access the network using the macro base station 110, UE 142 may be connected to a micro base station 122 using a micro base station 132, a micro base station 133, or the micro base station 134, be connected to the macro base station 110 using the micro base station 122, and further access the network using the macro base station 110, UE 143 may be connected to the micro base station 122 using a group constituted by the micro base station 132, the micro base station 133, or the micro base station 134, be connected to the macro base station 110 using the micro base station 122, and further access the network using the macro base station 110, and so on.

A technology described in the present disclosure may be applicable to a Long Term Evolution (LTE) system, or other wireless communications systems that use various radio access technologies, for example, systems that use access technologies such as CDMA, Frequency Division Multiple Access (FDMA), Time Division Multiple Access (TDMA), orthogonal FDMA (OFDMA), and single carrier FDMA (SCFDMA). In addition, the technology may also be applicable to an evolved system subsequent to the LTE system, for example, a $5^{th}$ Generation (5G) system. For clear description, only the LTE system is used as an example herein for description. In the LTE system, an evolved Universal Mobile Telecommunications System (UMTS) terrestrial radio access network E-UTRAN) is used as a radio access network, and an evolved packet core (EPC) is used as a core network. UE accesses an Internet Protocol (IP) multimedia subsystem (IMS) network using the E-UTRAN and the EPC.

In this application, terms "network" and "system" are usually used alternately, but a person skilled in the art can understand their meanings. UE in this application may include various handheld devices with a wireless communication function, various in-vehicle devices, various wearable devices, various computing devices, or other processing devices connected to a wireless modem, and various forms of UEs, mobile stations (MS), terminals, terminal equipment, or the like. For ease of description, in this application, the devices mentioned above are collectively referred to as UE. A macro base station and a micro base station in the present disclosure are apparatuses that are deployed in a radio access network and that are configured to provide a wireless communication function for UE. A device with a base station function may have different names in systems that use different radio access technologies. For example, such a device is referred to as an evolved Node B (eNB or eNodeB) in an LTE network, is referred to as a NodeB in a 3rd Generation (3G) network, and the like. For ease of description, in this application, the foregoing devices are collectively referred to as a macro base station or a macro eNB and a micro base station or a micro eNB.

Figure 2:
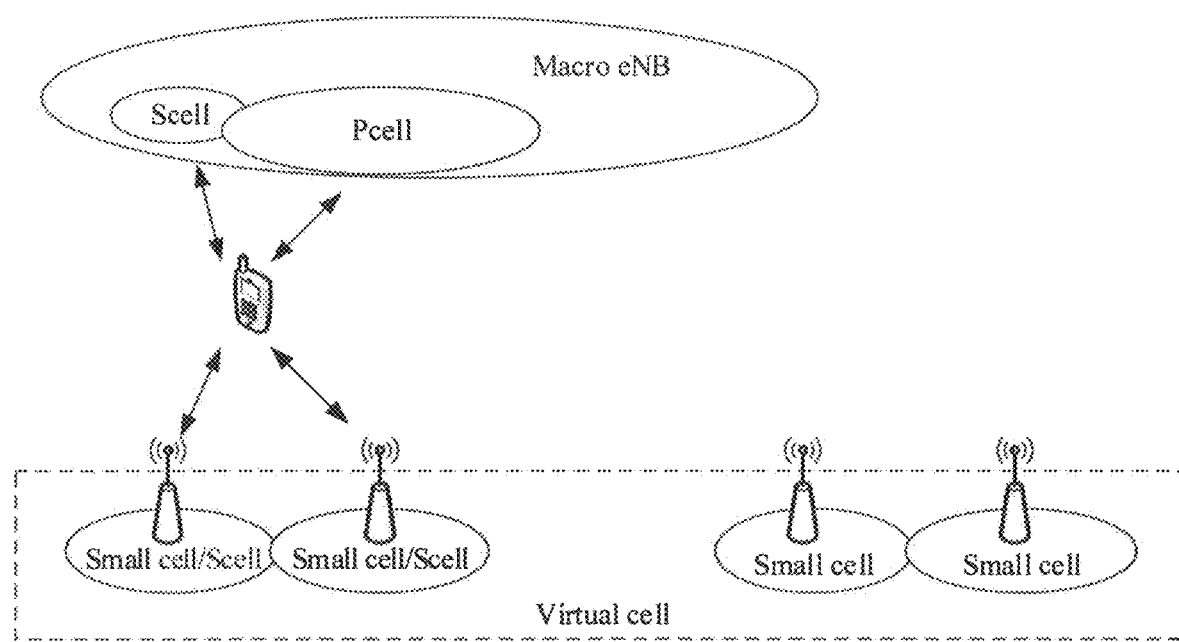
FIG. 2 is a schematic diagram of a virtual cell.

Deployment of a UDN leads to a large increase in a quantity of small cells, that is, physical cells, in a network. To simplify an operation, a virtual-cell mechanism is proposed. In this mechanism, a small cell, that is, a physical cell, that operates at 3.5 gigahertz (GHz) or in a higher frequency band broadcasts, in system information, whether the physical cell belongs to a virtual cell and a virtual PCI (VPCI) related to the virtual cell. FIG. 2 shows a relationship between a macro cell, a physical small cell, a virtual cell, and UE. A macro eNB corresponds to the macro cell, and a micro eNB corresponds to the small cell or a micro cell. FIG. 2 is a schematic network diagram of the virtual cell. As shown in FIG. 2, the UE is simultaneously connected to four cells, that is, has four serving cells. A physical cell (designated as PCell) is a primary serving cell of the UE, and provides information about mobility, security, non-access stratum (NAS) mobility, and the like. A small cell (designated as SCell) is a secondary serving cell of the UE. There are a total of three secondary serving cells. One of the three secondary serving cells is located in the macro eNB, and the other two are small cells/SCells belonging to the same virtual cell. Other cells are adjacent cells.

In a UDN, there are mainly three scenarios for deployment of a virtual cell.

Scenario 1: The virtual cell may be considered approximately as a macro cell. There is a main transmission point in the virtual cell. In this scenario, UE reports all measurement reports of all physical cells in the virtual cell to the main transmission point. A dual-link measurement mechanism may be applied.

Scenario 2: There is no main transmission point in the virtual cell. UE needs to send, to a macro eNB, a wireless control plane message related to the virtual cell and a physical cell in the virtual cell. The physical cell in the virtual cell is fixed and has a uniform VPCI. In this scenario, the UE also needs to send a measurement report of the virtual cell and the physical cell in the virtual cell to the macro eNB.

Scenario 3: There is no main sending point in the virtual cell. UE needs to send, to a macro eNB, a wireless control plane message related to the virtual cell and a physical cell in the virtual cell. The virtual cell is dynamic and uses a UE-centered architecture. In this scenario, the UE also needs to send a measurement report of the virtual cell and the physical cell in the virtual cell to the macro eNB.

It can be learnt from the foregoing descriptions that one virtual cell may be corresponding to multiple micro base stations, that is, a base station group. The following further describes the embodiments of the present disclosure in detail based on the foregoing common aspects related to the present disclosure.

An embodiment of the present disclosure provides a communication method, and UE, a micro base station, a macro base station, and a system that are based on the method.

A micro base station side needs to broadcast backhaul link information of the micro base station. The backhaul link information includes at least one of the following information.

1. A link type, for example, a fiber-optic type or a wireless type, may be included. Still as shown in FIG. 1, a link between the micro base station 122 and the macro base station 110 is a fiber-optic link. In this case, when the micro base station 122 broadcasts backhaul link information, a link may be a fiber-optic link. A link between the micro base station 121 and the micro base station 131 is a wireless link. In this case, when the micro base station 131 broadcasts backhaul link information, a link may be a wireless link.

2. A link status may be included, for example, whether the micro base station is in an intermediate transmission state or an end transmission state. Still as shown in FIG. 1, the micro base station 122 is connected to the macro base station 110 directly using an optical fiber, and in this case, the micro base station 122 may be considered as being in an end transmission state. When the micro base station 122 broadcasts backhaul link information, a link status is an end transmission state. The micro base station 131 is connected to the micro base station 121 in a wireless manner. When the micro base station 131 broadcasts backhaul link information, a link status is an intermediate transmission state.

3. A link level may be included, for example, a specific grade or level in an intermediate transmission state. Still as shown in FIG. 1, the micro base station 122 is connected to the macro base station 110 directly using an optical fiber. A link level of the micro base station 122 may be level-1 fiber-optic backhaul. The micro base station 131 is connected to the micro base station 121 in a wireless manner, and the micro base station 121 is connected to the macro base station 110 directly using an optical fiber. A link level of the micro base station 131 may be level-1 wireless backhaul. The micro base station 134 is connected to the micro base station 132 in a wireless manner, the micro base station 132 is connected to the micro base station 122 in a wireless manner, and the micro base station 122 is connected to the macro base station 110 directly using the optical fiber. A link level of the micro base station 134 may be level-2 wireless backhaul. The rest may be deduced by analogy.

4. Information about acceptable load may be included, for example, load and a remaining capacity of a backhaul link. Alternatively, indication information such as strong acceptability, intermediate acceptability, or weak acceptability is directly used as the information about acceptable load. Alternatively, the information about acceptable load may be an acceptable load ratio or an occupied load ratio. For example, L percent (%) is information that is about acceptable load and that is broadcast by a base station, where L represents a percentage of load that can be further accepted, and L may be a predefined default capacity value. This can reflect a load status of a backhaul link more intuitively such that backhaul link selection is more accurate and link selection by UE is more appropriate.

A protection boundary may be set for an acceptable load ratio of the base station. During broadcasting of the acceptable load ratio, the base station broadcasts information obtained by subtracting the protection boundary from an actual acceptable load ratio of the base station. In this way, information about acceptable load of the micro base station can be calculated more accurately, an actual load status can be better reflected, and link selection is more appropriate.

For example, the base station or operation and management (OAM) statistically calculates whether a network can satisfy UE requirement. When multiple UEs determine to perform activation and the base station needs to provide a service for the multiple UEs, and when backhaul load cannot satisfy requirements of the multiple UEs, a network side may set a protection boundary. In this case, information that is about acceptable load and that is actually broadcast is obtained by subtracting the protection boundary from information about actual acceptable load of the base station, where the protection boundary is determined according to a preset rule. For example, an acceptable load ratio that is actually broadcast is equal to a currently known load ratio minus the protection boundary.

In addition, because a parent base station may be connected to multiple child base stations and some of the child base stations are in an active state, an acceptable load ratio of an inactive child base station may be equal to a total backhaul capacity of the parent base station minus a total capacity of the active child base station. The parent base station may notify the inactive child base station connected to the parent base station of the active state or an acceptable load ratio of the child base station connected to the parent base station. In this way, information about acceptable load of a micro base station can be calculated more accurately, an actual load status can be better reflected, and link selection is more appropriate.

For example, generally, no problem occurs if a small cell is not in an active state and a parent cell of the small cell is not in an active state either. However, considering a case in which a parent cell is connected to more than one small cell (also referred as child cell) and these child cells are possibly in an active state, a remaining backhaul capacity that can be obtained needs to be limited by a backhaul capacity of the parent cell. This is an actual remaining backhaul capacity of a small cell 1 (in an inactive state).

Therefore, a remaining capacity of a lower level (that is a child cell) needs to be obtained by subtracting a remaining capacity of the other child cell from a capacity of a parent cell. This requires notification by the parent cell to an inactive child cell using signaling on a backhaul link. The notification performed using signaling may be backhaul signaling, and further, may be sent in a separate frequency band different from that of an access link of the small cell or at a frequency the same as that of an access link of the small cell. When the frequency the same as that of the access link is used, a transmission power of the signaling needs to be designed as greater than a power used for a general broadcast message on the access link.

According to this embodiment of the present disclosure, the UE can obtain the backhaul link information by receiving a broadcast or the like. In this way, it is possible to select, according to the backhaul link information, a proper backhaul link to perform data backhaul, and backhaul link allocation is more appropriate.

For example, when the method provided in this embodiment of the present disclosure is applied to an LTE system, information that needs to be broadcast on an eNB side includes a backhaul type, for example, fiber optic backhaul or wireless backhaul, an intermediate transmission state or an end transmission state, and a grade or level in an intermediate transmission state.

A small cell at a different grade or level needs to broadcast load of a backhaul link of the small cell, and UE that accesses the small cell needs to determine whether a quality of service (QoS) requirement of the UE is satisfied.

A level-2 micro eNB (that is, a micro eNB that is not directly connected to a macro eNB using an optical fiber) broadcasts a direct wireless backhaul status of the level-2 micro eNB.

A level-3 micro eNB broadcasts a two-level wireless backhaul status of the level-3 micro eNB.

Information about acceptable load may be strong acceptability, intermediate acceptability, or weak acceptability, a bearable capacity ratio, or the like.

When the UE needs to access a micro base station, it indicates that data of the UE needs to be transmitted using a backhaul link of the micro base station. The UE obtains information that is broadcast by the micro base station, performs determining according to a local requirement, and selects a micro base station with a backhaul link that meets a requirement, to perform communication. When the micro base station that meets the requirement is in an inactive state, the UE sends an activation signal to the micro base station to activate the micro base station, and accesses the micro base station.

According to this method embodiment, the base station broadcasts backhaul link information, and the UE determines a to-be-accessed base station according to the information. This reduces working load of the base station, makes backhaul link allocation more appropriate, and improves data transmission efficiency.

Figure 3:
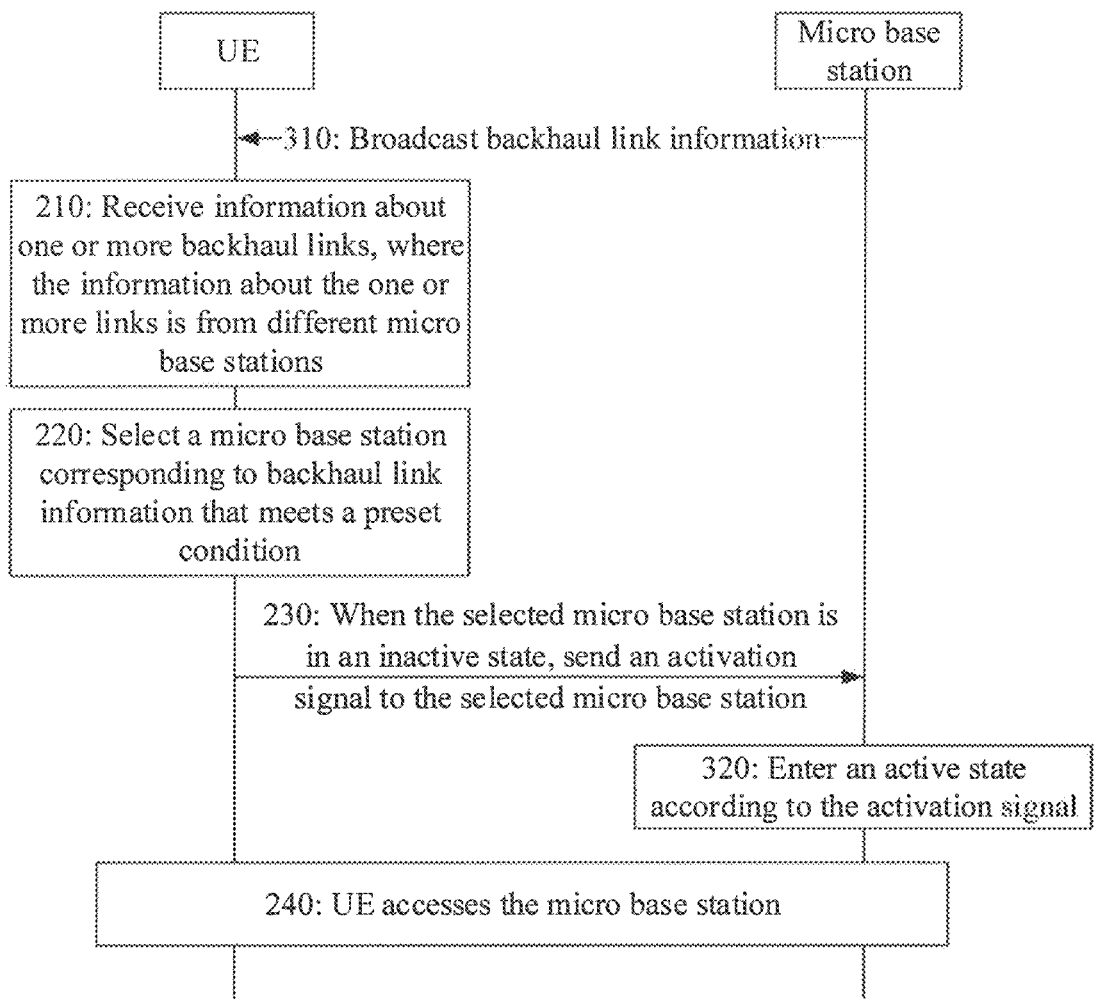
FIG. 3 is a schematic flowchart of a communication method according to an embodiment of the present disclosure.

The following further describes this embodiment of the present disclosure with reference to FIG. 3.

As shown in FIG. 3, this embodiment of the present disclosure may include the following steps.

Step 310: A micro base station broadcasts backhaul link information of the micro base station.

The micro base station may broadcast the backhaul link information of the micro base station according to a specific rule such that UE can receive the broadcast information. A specific broadcast manner may be as follows.

Manner 1: When the micro base station is in an active working mode, that is, an active state, the micro base station generally broadcasts some broadcast information, for example, a master information block (MIB) or a system information block (SIB). The backhaul link information of the micro base station may be carried in the broadcast information for indication. Alternatively, dedicated broadcast information may be set to indicate the backhaul link information of the micro base station. In this way, the micro base station can broadcast the backhaul link information when the micro base station is in the active state.

Manner 2: When the micro base station is in a non-active working mode, that is, an inactive state, the micro base station is activated at a specific interval, to serve a specific object. In the inactive state, the micro base station broadcasts only a discovery signal (e.g. CSI-RS signal). The micro base station may broadcast the backhaul link information of the micro base station in a period that is the same as or a multiple of a period in which the discovery signal is broadcast. The backhaul link information of the micro base station may be carried in the discovery signal for broadcast, or may be broadcast in a manner the same as a manner of broadcasting the discovery signal. In this way, the micro base station can broadcast the backhaul link information when the micro base station is in the inactive state.

It should be noted that the foregoing manners in which the micro base station broadcasts the backhaul link information of the micro base station are merely examples herein. There are multiple other specific implementations. For conciseness, details are not described.

Step 210: UE receives information about one or more backhaul links, where the information about the one or more backhaul links is from different micro base stations.

When the UE has a communication requirement, the UE may be at any location, that is, the UE may be located within a signal coverage area of one micro base station or may be located within signal coverage areas of multiple micro base stations. When the UE has a communication requirement, the UE may receive backhaul link information that is broadcast by each base station. Alternatively, backhaul link information that is broadcast by each base station and that is received in a specific time before the UE has a communication requirement may be used. For example, the specific time may be one discontinues reception (DRX) cycle.

Step 220: The UE selects a micro base station corresponding to backhaul link information that meets a preset condition.

The preset condition may be determined according to a data transmission requirement of the UE. The data transmission requirement of the UE may be a local requirement of the UE, and further, may be one or a combination of a QoS requirement of the UE, a delay requirement of the UE, a requirement of the UE on an acceptable load ratio, or the like. For example, when the UE needs a micro base station for data backhaul, the UE selects a micro base station corresponding to information about a link whose information about acceptable load is strong acceptability and whose delay is shortest. For another example, the UE may select a micro base station corresponding to information about a link that has a sufficiently large capacity. The sufficiently large capacity may be determined according to information about acceptable load of the link. For example, when information that is about acceptable load of a link and that is received by the UE is intermediate acceptability or strong acceptability, it is determined that the link has a sufficiently large capacity. Alternatively, when an acceptable load ratio or an occupied load ratio of a link received by the UE reaches a threshold, it is determined that the link has a sufficiently large capacity.

The backhaul link information includes an active state, an inactive state, and the like. In addition, the backhaul link information received by the UE may be information about one or more backhaul links. The following provides detailed descriptions for different cases.

When the UE receives only information about one link and the information about the link is information about an active link, the UE determines whether the information about the link meets the preset condition. If the preset condition is met, the UE accesses a micro base station corresponding to the information about the link. If the preset condition is not met, the UE continues to receive backhaul link information.

When the UE receives only information about one link and the information about the link is information about an inactive link, the UE determines whether the information about the link meets the preset condition. If the preset condition is met, the UE sends an activation signal to a micro base station corresponding to the information about the link, and accesses the micro base station after the micro base station is activated. If the preset condition is not met, the UE continues to receive backhaul link information.

When the UE receives information about multiple backhaul links and the information about the multiple links is information about active links, the UE selects a micro base station corresponding to link information that meets the preset condition, and accesses the micro base station. If there are multiple links whose information meets the preset condition, a micro base station corresponding to information about one optimum link may be selected. For example, a micro base station corresponding to information about a link corresponding to information about one link whose delay is shortest is selected. When no link information meets the preset condition, the UE continues to receive backhaul link information.

When the UE receives information about multiple backhaul links and the information about the multiple links is information about inactive links, the UE selects a micro base station corresponding to link information that meets the preset condition, and sends an activation signal to the micro base station. If there are multiple links whose information meets the preset condition, a micro base station corresponding to information about one optimum link may be selected. When no link information meets the preset condition, the UE continues to receive backhaul link information.

When the UE receives information about multiple backhaul links and the information about the multiple links includes both information about an inactive link and information about an active link, the UE determines whether there is information that is about an active link and that meets the preset condition. If there is such information, the UE selects a micro base station corresponding to the information that is about the active link and that meets the preset condition, and accesses the micro base station. When there is no information that is about an active link and that meets the preset condition, the UE selects a micro base station corresponding to information that is about an inactive link and that meets the preset condition, and sends an activation signal to the micro base station. When neither exists, the UE continues to receive backhaul link information. There may be multiple specific determining manners. For example, link information may be first screened according to the preset condition, and then whether the link information is an active state is determined. Alternatively, whether link information is an active state may be first determined, and then link information selection is performed. The foregoing two cases are acceptable so long as the foregoing objective can be achieved. Details are not described.

In the foregoing manner, the following can be implemented. The UE preferentially selects an active link when the link information received by the UE includes both information about an active link and information about an inactive link. When no active link meets a condition, the UE selects an inactive link. Because some energy needs to be consumed to activate a micro base station, in this way, unnecessary energy consumption can be avoided as far as possible.

Step 230: The UE sends an activation signal to the selected micro base station when the selected micro base station is in an inactive state.

The activation signal includes at least one of a preamble, a serial number, a CDMA code, a reference signal, a sounding signal, or a PCI. According to this embodiment of the present disclosure, the UE can activate the micro base station using any one of the foregoing signals, thereby making it possible for the UE to activate the micro base station. In addition, the UE can activate only the specific base station, thereby reducing energy consumed for activating an unnecessary base station.

It should be noted that the UE predefines or a macro base station configures a wakeup time, information about a resource that is initially accessed, and the activation signal. The UE sends the foregoing information to the micro base station, to activate the micro base station. The macro base station may broadcast the foregoing information in a broadcast manner such that the UE receives the foregoing information. Then, the UE can activate the micro base station, and the micro base station can be activated at a specified time and implement access of the UE.

The UE may send an uplink activation signal to the micro base station using the PCI of the micro base station. The micro base station feeds back a confirmation signal using an acknowledgement (ACK), and performs scrambling using the PCI. In this way, the UE can activate the micro base station, and activate only the micro base station with the specific PCI, thereby reducing energy consumed for activating an unnecessary base station.

Alternatively, the UE may send the activation signal using a blind uplink beacon signal. An uplink power may be estimated according to a detected downlink signal power of a discovery reference signal that is broadcast by the micro base station and according to a threshold and/or an offset value that are/is predefined or that are/is notified of by the base station using signaling such that only the specific base station is activated based on a common threshold. After receiving the activation signal, the base station feeds back a PCI based on local detection. When a single base station cannot meet a preset condition (no physical cell meets the preset condition), but a base station group constituted by base stations can meet the preset condition (a virtual cell meets the preset condition), the UE needs to send an activation signal to activate all the base stations corresponding to the group (activate all micro base stations in the virtual cell). For example, activation is performed using a VPCI. The VPCI can identify one base station group. In this case, although the single micro base station cannot meet the condition of the UE, the base station group can meet the condition. This increases value of this embodiment of the present disclosure in actual application.

For example, if one UE detects different paths, the UE may choose to activate different paths, depending on QoS requirements about a bandwidth and a delay. The UE locally determines whether to trigger sending of the uplink beacon signal and when to send the uplink beacon signal. An eNB may be woken up using a PCI of a cell that is to be woken up. This can reduce configuration costs. Alternatively, a general format may be used. The general format may be any signal/sequence/code.

In addition, when the UE is connected to the macro base station, the UE may activate a second micro base station using the macro base station. Further, the UE may send activation information to the macro base station. The activation information may be an activation signal, or may be an identity of the base station that needs to be activated and corresponding duration. After the macro base station receives the activation information sent by the UE, if the activation information is the activation signal, the macro base station may directly send the activation information to the second micro base station that needs to be activated. If the activation information is the identity of the base station that needs to be activated and the corresponding duration, the macro base station may send an activation signal to the second micro base station.

For example, when the UE receives signaling from a small cell and remains connected to the macro eNB, if access cannot be performed in a timely manner on a predefined wakeup resource, the UE feeds back required activation information to the macro eNB to request the macro eNB to provide a corresponding notification to an eNB serving the small cell. This takes into consideration that, a waste of resources is caused when some specific resources are used for wakeup signal transmission, resulting in a relatively long period, thereby leading to a relatively long delay that is far greater than a delay required for notifying the small cell through a fiber-optic interface in a dual-link manner using the macro eNB.

The macro base station may notify the micro base station of a working mode of the micro base station and/or the activation information using a specific information element (IE).

Further, the specific IE may be added to serving cell information in an X2 setup request, an X2 setup response, and an eNB configuration update (i.e., base station configuration update). Alternatively, the specific IE may be directly added to an X2 setup request, an X2 setup response, and an eNB configuration update. The X2 setup request, the X2 setup response, and the eNB configuration update are signaling transmitted on X2 between the micro base station and the macro base station.

Alternatively, the specific IE may be sent as a specific IE using X2, for example, in a transmission manner the same as that of overload information (OI).

Step 320: When the micro base station is in an inactive state, the micro base station receives the activation signal that is sent to the micro base station after the UE selects the micro base station based on the backhaul link information, and the micro base station enters the active state according to the activation signal.

After a base station in a non-active working mode receives an activation signal sent by the UE or the macro base station, the base station is activated according to the activation signal, and enters an active working mode. Awake duration of the base station and content of a service that needs to be provided by the base station may be determined according to information carried in the activation signal. This takes into consideration that, when the activation signal is transmitted using some specific resources, some resources are occupied, a period is relatively long, and a delay is relatively long, sending the activation signal to the micro base station through a fiber-optic interface using the macro base station is more resource saving.

Step 240: The UE accesses the selected micro base station.

The UE may obtain cell information, an uplink transmit power, an uplink advance, and other information about the micro base station, and send, to the micro base station using the foregoing information, data that needs to be backhauled.

Alternatively, the UE may randomly access the micro base station, implement uplink synchronization, and send to-be-backhauled data to the selected micro base station.

There are multiple other manners of accessing the selected micro base station by the UE. Details are not described.

In addition, for a process in which the UE accesses the micro base station, refer to related descriptions in a communications standard.

According to this method embodiment, the following can be implemented. When the UE does not detect any active link that meets a requirement, the UE performs communication by activating an inactive link that meets a condition, and activates only a base station that needs to be accessed in order to save energy. The UE accesses a base station only when a capacity of a backhaul link of the base station is sufficiently large. This reduces a probability that communication is slow because bearable load of a link is exceeded when the UE accesses a quite busy base station.

In a specific implementation process of this embodiment of the present disclosure, when performing link reception, the UE may receive information about multiple active links, that is, first link information includes information about multiple links. In this case, the UE needs to select a base station corresponding to a link that best meets a requirement to access the base station.

Whether a delay of a first link satisfies a requirement may be determined. The delay of the first link may be determined according to a link level of the first link. Further, whether the first link has a sufficiently large capacity to bear data of the UE may be determined. This may be determined according to an acceptable load ratio of the first link. According to the method, the UE selects a link that not only has a sufficiently large capacity to bear the data of the UE but also has a shortest delay, to perform access.

The foregoing describes the solution provided in this embodiment of the present disclosure mainly from a perspective of interaction between network elements. It can be understood that the network elements, for example, the UE, the micro base station, and the macro base station, include corresponding hardware structures and/or software modules for performing the functions in order to implement the foregoing functions. A person skilled in the art should be easily aware that, in the present disclosure, units and algorithm steps in examples described with reference to the embodiments disclosed in this specification may be implemented by hardware or a combination of hardware and computer software. Whether a function is performed by hardware or computer software driving hardware depends on a particular application and a design constraint condition of the technical solution. A person skilled in the art may use different methods to implement the described functions for each particular application, but it should not be considered that such an implementation goes beyond the scope of the present disclosure. The following provides detailed descriptions with reference to accompanying drawings.

Figure 4:
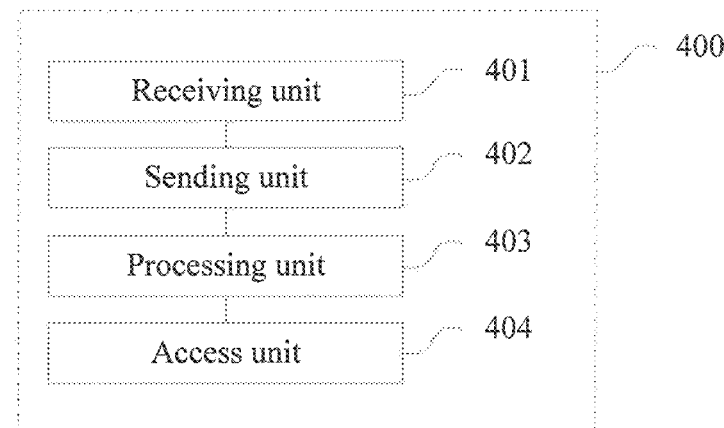
FIG. 4 is a schematic structural diagram of UE according to an embodiment of the present disclosure.

As shown in FIG. 4, FIG. 4 is a schematic structural diagram of UE 400 according to an embodiment of the present disclosure.

The UE 400 is applicable to a UDN. The UE 400 includes a receiving unit 401 configured to receive information about one or more backhaul links, where the information about the one or more backhaul links is from different micro base stations, a processing unit 403 configured to select a micro base station corresponding to backhaul link information that meets a preset condition, a sending unit 402 configured to send an activation signal to the selected micro base station when the selected micro base station is in an inactive state, and an access unit 404 configured to access the selected micro base station.

Optionally, the information about the backhaul link includes at least one of a link type, a link status, a link level, or information about acceptable load.

Optionally, the information about acceptable load includes strong acceptability, intermediate acceptability, weak acceptability, an acceptable load ratio, or an occupied load ratio.

Optionally, the information about the backhaul link includes information about an active link, and the processing unit 403 is further configured to select a first micro base station corresponding to information about an active link whose information about acceptable load reaches a threshold and whose delay is shortest.

Optionally, the information about the backhaul link includes information about an inactive link, and the processing unit 403 is further configured to select a second micro base station corresponding to information about an inactive link whose information about acceptable load reaches a threshold and whose delay is shortest.

Optionally, the link information includes information about an active link and information about an inactive link, and the processing unit 403 is further configured to select a second micro base station corresponding to information about an inactive link whose information about acceptable load reaches a threshold and whose delay is shortest when the information about the active link does not meet the preset condition.

Optionally, the activation signal is used to indicate an activation time of the selected micro base station and information about a resource that is initially accessed.

Optionally, the activation signal includes at least one of a preamble, a serial number, a CDMA code, a reference signal, a sounding signal, or a PCI.

Optionally, the activation signal is a blind uplink beacon signal or a PCI.

Optionally, the sending unit 402 is further configured to estimate an uplink power according to a detected downlink signal power of a discovery reference signal that is broadcast by the selected micro base station and according to a threshold and/or an offset value that are/is predefined or that are/is notified of by the base station using signaling, where the discovery reference signal is a CRS or a CSI-RS, and send the activation signal to the selected micro base station using the uplink power.

Optionally, the selected micro base station is connected to a macro base station, and the sending unit 402 is further configured to send activation information to the macro base station when the UE is connected to the macro base station, where the activation information includes an identity of the selected micro base station such that the macro base station sends the activation signal to the selected micro base station.

Optionally, when the selected micro base station belongs to a base station group, the sending unit 402 is further configured to send a preset activation signal to the base station group to which the selected micro base station belongs in order to activate the base station group.

Figure 5:
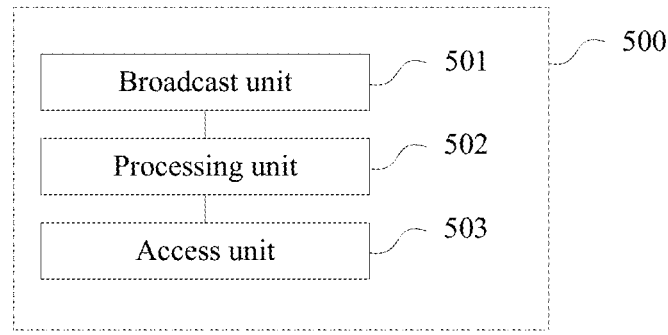
FIG. 5 is a schematic structural diagram of a micro base station according to an embodiment of the present disclosure.

As shown in FIG. 5, FIG. 5 is a schematic structural diagram of a micro base station 500 according to an embodiment of the present disclosure.

The micro base station 500 is applicable to a UDN. The micro base station 500 includes a broadcast unit 501 configured to broadcast backhaul link information, when the micro base station 500 is in an inactive state, a processing unit 502 configured to receive an activation signal that is sent to the micro base station 500 after the UE selects the micro base station 500 based on the backhaul link information, and enter an active state according to the activation signal, and an access unit 503 configured to perform access of the UE when the UE accesses the selected micro base station 500.

Optionally, the backhaul link information includes at least one of a link type, a link status, a link level, or information about acceptable load.

Optionally, when the micro base station 500 is in an active state, the broadcast unit 501 is further configured to transmit the backhaul link information alone in a form of broadcast information, or add the backhaul link information to other broadcast information for transmission.

Optionally, when the micro base station 500 is in an inactive state, the broadcast unit 501 is further configured to transmit the backhaul link information alone in a manner the same as a manner of broadcasting a discovery reference signal and in a period that is the same as or a multiple of a period in which the discovery signal is broadcast, or add the backhaul link information to the discovery reference signal for transmission.

Optionally, the information about acceptable load includes at least one of strong acceptability, intermediate acceptability, weak acceptability, an acceptable load ratio, or an occupied load ratio.

Optionally, the micro base station 500 corresponds to a parent base station, the parent base station corresponds to several child base stations, and the information about acceptable load is obtained by subtracting a total capacity of another active child base station from a total backhaul capacity of the parent base station.

Optionally, a protection boundary is set for the micro base station 500, and the information about acceptable load is obtained by subtracting the protection boundary from actual acceptable load of the micro base station 500.

Optionally, the processing unit 502 is further configured to statistically calculate, for the micro base station 500, whether a backhaul capacity of the micro base station 500 can satisfy a requirement of the UE, and set, for the micro base station 500, the protection boundary according to a preset rule when the micro base station 500 needs to provide a service for multiple UEs and the micro base station 500 cannot simultaneously satisfy requirements of the multiple UEs.

Figure 6:
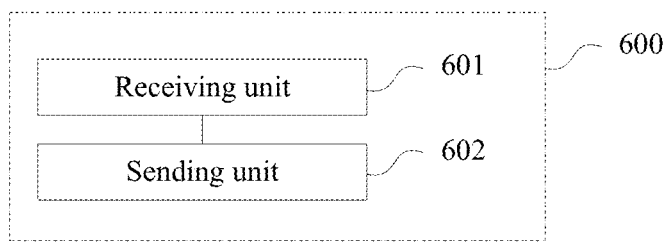
FIG. 6 is a schematic structural diagram of a macro base station according to an embodiment of the present disclosure.

As shown in FIG. 6, FIG. 6 is a schematic structural diagram of a macro base station 600 according to an embodiment of the present disclosure.

The macro base station 600 is applicable to a UDN. The macro base station 600 includes a receiving unit 601 configured to receive activation information that is sent by UE after the UE selects a micro base station based on backhaul link information that is broadcast by the micro base station, where the activation information includes an identity of the selected micro base station, and a sending unit 602 configured to send an activation signal to the selected micro base station based on the identity of the selected micro base station, where the activation signal is specific information and is used to indicate a working mode of the micro base station and the activation information.

Figure 7:
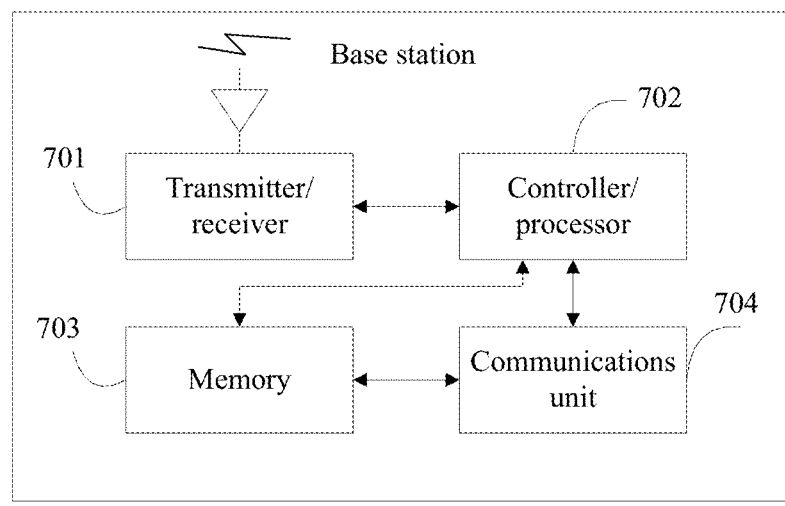
FIG. 7 is a schematic structural diagram of a base station according to an embodiment of the present disclosure.

FIG. 7 is a possible schematic structural diagram of a base station in the foregoing embodiments.

The base station includes a transmitter/receiver 701, a controller/processor 702, a memory 703, and a communications unit 704. The transmitter/receiver 701 is configured to support the base station in transmitting/receiving information to/from the UE in the foregoing embodiments, and support the UE in performing radio communication with another UE. The controller/processor 702 performs various functions used for communication with the UE. On an uplink, an uplink signal from the UE is received using an antenna, demodulated by the transmitter/receiver 701, and further processed by the controller/processor 702 to restore service data and signaling information that are sent by the UE. On a downlink, the controller/processor 702 processes the service data and a signaling message, and the transmitter 701 demodulates processed service data and a processed signaling message to generate a downlink signal, and transmits the downlink signal to the UE using an antenna. The controller/processor 702 further executes a processing process related to the base station in FIG. 3 and/or another process used in the technology described in this application. The memory 703 is configured to store program code and data of the base station. The communications unit 704 is configured to support the base station in communicating with another network entity. For example, the communications unit 704 is configured to support the base station in communicating with another communications network entity, for example, a mobility management entity (MME), a serving gateway (SGW), and/or a public data network (PDN) gateway (PGW) that are/is located in a core network EPC.

Both a micro base station and a macro base station may use the structure shown in FIG. 7. However, in specific implementation, signal processing capabilities, signal processing processes, capacities, and the like of the macro base station and the micro base station are different.

It can be understood that FIG. 7 shows only a simplified design of the base station. In actual application, the base station may include any quantities of transmitters, receivers, processors, controllers, memories, communications units, and the like. All base stations that can implement the present disclosure fall within the protection scope of the present disclosure.

Figure 8:
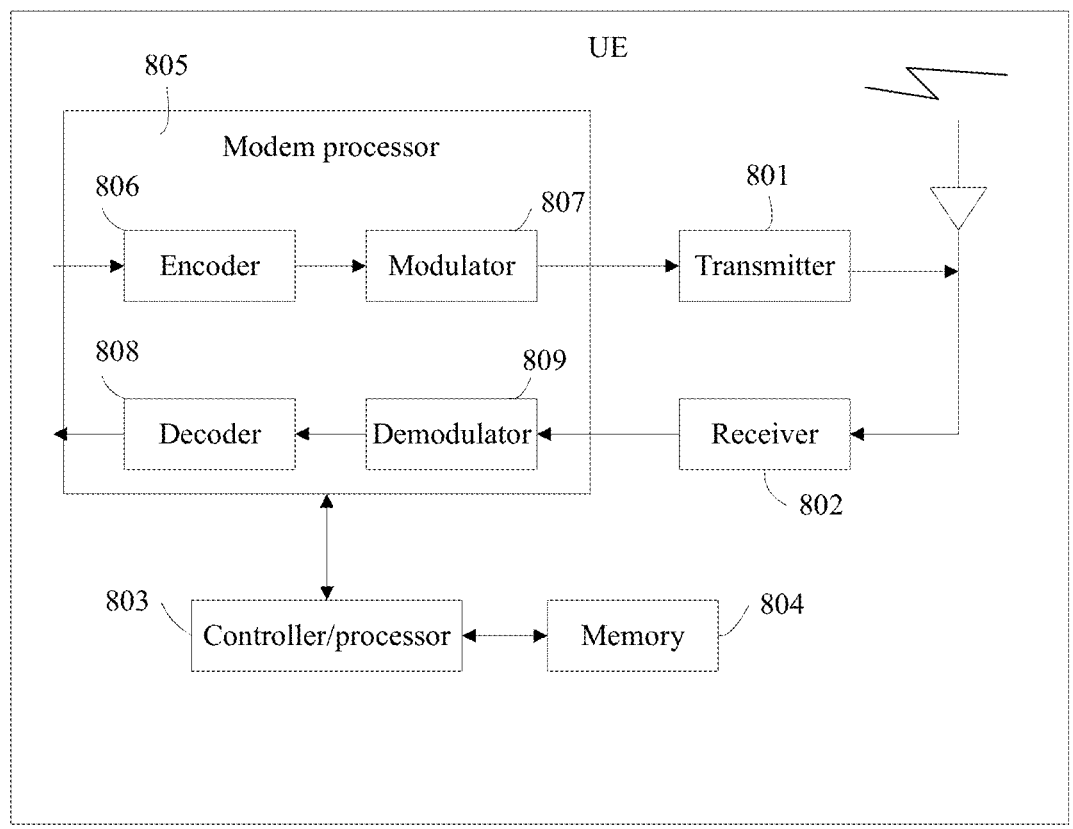
FIG. 8 is a schematic structural diagram of another UE according to an embodiment of the present disclosure.

FIG. 8 is a simplified schematic diagram of a possible design structure of UE in the foregoing embodiments. The UE includes a transmitter 801, a receiver 802, a controller/processor 803, a memory 804, and a modem processor 805.

The transmitter 801 performs adjustment (for example, analog conversion, filtering, amplification, or up-conversion) on the output sample and generates an uplink signal. The uplink signal is transmitted to the base station in the foregoing embodiments using an antenna. On a downlink, an antenna receives a downlink signal transmitted by the base station in the foregoing embodiments. The receiver 802 performs adjustment (for example, filtering, amplification, down-conversion, or digitization) on the signal received from the antenna and provides an input sample. In the modem processor 805, an encoder 806 receives service data and a signaling message that are to be sent on an uplink, and processes (for example, formats, encodes, or interleaves) the service data and the signaling message. A modulator 807 performs further processing (for example, symbol mapping or modulation) on encoded service data and an encoded signaling message, and provides an output sample. A demodulator 809 processes (for example, demodulates) the output sample and provides a symbol estimate. A decoder 808 processes (for example, de-interleaves or decodes) the symbol estimate and provides the decoded data and signaling message that are to be sent to the UE. The encoder 806, the modulator 807, the demodulator 809, and the decoder 808 may be implemented by the integrated modem processor 805. These units perform processing according to a radio access technology (for example, an access technology for an LTE system and another evolved system) used for a radio access network.

The controller/processor 803 controls and manages an action of the UE, and is configured to execute processing, in the foregoing embodiments, performed by the UE. For example, the controller/processor 803 is configured to control the UE to receive paging according to a received long DRX cycle and/or perform another process of the technologies described in the present disclosure. For example, the controller/processor 803 is configured to support the UE in executing the processes 210, 220, and 230 in FIG. 3. The memory 804 is configured to store program code and data used for the UE.

A person skilled in the art may be further aware that, units and algorithm steps in examples described with reference to the embodiments disclosed in this specification may be implemented by electronic hardware, computer software, or a combination thereof. To clearly describe interchangeability between the hardware and the software, the foregoing has generally described compositions and steps of the examples according to functions. Whether the functions are performed by hardware or software depends on particular applications and design constraint conditions of the technical solutions. A person skilled in the art may use different methods to implement the described functions for each particular application, but it should not be considered that such an implementation goes beyond the scope of the present disclosure.

Steps of methods or algorithms described with reference to the embodiments disclosed in this specification may be implemented by hardware, a software module executed by a processor, or a combination thereof. The software module may be located in a random access memory (RAM), a memory, a read-only memory (ROM), an electrically programmable ROM, an electrically erasable programmable ROM, a register, a hard disk, a removable disk, a compact disc ROM (CD-ROM), or a storage medium of any other form that is commonly known in the art.

In the foregoing specific implementations, the objectives, technical solutions, and beneficial effects of the present disclosure are further described in detail. It should be understood that the foregoing descriptions are merely specific implementations of the present disclosure, but are not intended to limit the protection scope of the present disclosure. Any modification, equivalent replacement, improvement, or the like made without departing from the spirit and principle of the present disclosure shall fall within the protection scope of the present disclosure.

What is claimed is:

1. A device applicable to an ultra-dense network (UDN), comprising:
    a receiver configured to receive information about one or more backhaul links, wherein the information about the one or more backhaul links is from a plurality of micro base stations, and wherein the one or more backhaul links communicatively couple the plurality of micro base stations to a core network through a donor base station;
    a processor coupled to the receiver and configured to select one of the plurality of micro base stations corresponding to backhaul link information meeting a preset condition as a selected micro base station; and
    a transmitter coupled to the processor and configured to send an activation signal to the selected micro base station when the selected micro base station is in an inactive state,
    wherein the inactive state comprises the selected micro base station only broadcasting a discovery signal that carries the backhaul link information, and
    wherein the processor is further configured to access the selected micro base station.

2. The device of claim 1, wherein the information about the one or more backhaul links comprises at least one of a link type, a link status, a link level, or information about an acceptable load.

3. The device of claim 2, wherein the information about the acceptable load comprises strong acceptability, intermediate acceptability, weak acceptability, an acceptable load ratio, or an occupied load ratio.

4. The device of claim 1, wherein the information about the backhaul link comprises information about an active link, and wherein the processor is further configured to select a first micro base station corresponding to the information about the active link whose information about acceptable load reaches a threshold and whose delay is a shortest.

5. The device of claim 1, wherein the information about the backhaul link comprises information about an inactive link, and wherein the processor is further configured to select a second micro base station corresponding to the information about the inactive link whose information about acceptable load reaches a threshold and whose delay is a shortest.

6. The device of claim 1, wherein the information about the one or more backhaul links comprises information about an active link and information about an inactive link, and wherein the processor is further configured to select a second micro base station corresponding to information about an inactive link whose information about an acceptable load reaches a threshold and whose delay is a shortest when the information about the active link does not meet the preset condition.

7. The device of claim 1, wherein the activation signal indicates an activation time of the selected micro base station and information about a resource that is initially accessed.

8. The device of claim 7, wherein the activation signal comprises at least one of a preamble, a serial number, a Code Division Multiple Access (CDMA) code, a reference signal, a sounding signal, or a physical cell identifier (ID).

9. The device of claim 7, wherein the activation signal comprises a blind uplink beacon signal or a physical cell identifier (PCI).

10. The device of claim 7, wherein the transmitter is further configured to:
estimate an uplink power according to a detected downlink signal power of a discovery reference signal from the selected micro base station and according to a threshold or an offset value that is predefined or that is notified of by the selected micro base station using signaling, wherein the discovery reference signal comprises a common reference signal (CRS) or a cell-specific reference signal (CSI-RS); and
send the activation signal to the selected micro base station using the uplink power.

11. The device of claim 1, wherein the selected micro base station is coupled to a macro base station, wherein the transmitter is further configured to send activation information to the macro base station when the device is coupled to the macro base station, and wherein the activation information comprises an identity of the selected micro base station to send the activation signal to the selected micro base station.

12. The device of claim 1, wherein the selected micro base station belongs to a base station group, and wherein the transmitter is further configured to send a preset activation signal to the base station group to which the selected micro base station belongs to activate the base station group.

13. A micro base station, applicable to an ultra-dense network (UDN), wherein the UDN comprises the micro base station and a plurality of other micro base stations that are communicatively coupled to a core network through a donor base station using one or more backhaul links, and wherein the micro base station comprises:
a transmitter configured to broadcast backhaul link information; and
a processor coupled to the transmitter and configured to:
receive an activation signal from user equipment (UE) after selecting the micro base station based on the backhaul link information and when the micro base station is in an inactive state, wherein the inactive state comprises the micro base station only broadcasting a discovery signal that carries the backhaul link information;
enter an active state according to the activation signal; and
access the UE when the UE accesses the micro base station.

14. The micro base station of claim 13, wherein the backhaul link information comprises at least one of a link type, a link status, a link level, or information about an acceptable load.

15. The micro base station of claim 14, wherein the information about the acceptable load comprises at least one of strong acceptability, intermediate acceptability, weak acceptability, an acceptable load ratio, or an occupied load ratio.

16. The micro base station of claim 15, wherein the micro base station corresponds to a parent base station, wherein the parent base station corresponds to several child base stations, and wherein the information about the acceptable load is obtained by subtracting a total capacity of another active child base station from a total backhaul capacity of the parent base station.

17. The micro base station of claim 15, wherein a protection boundary is set for the micro base station, and wherein the information about the acceptable load is obtained by subtracting the protection boundary from an actual acceptable load of the micro base station.

18. The micro base station of claim 13, wherein when the micro base station is in the active state, the transmitter is further configured to:
transmit the backhaul link information alone in a form of broadcast information; or
add the backhaul link information to other broadcast information for transmission.

19. The micro base station of claim 13, wherein when the micro base station is in the inactive state, the transmitter is further configured to:
transmit the backhaul link information alone in a manner the same as a manner of broadcasting a discovery reference signal and in a period the same as or a plurality of periods in which the discovery signal is broadcast; or
add the backhaul link information to the discovery reference signal for transmission.

20. A macro base station, applicable to an ultra-dense network (UDN), wherein the UDN comprises the macro base station and a plurality of micro base stations that are communicatively coupled to a core network through a donor base station using one or more backhaul links, and wherein the macro base station comprises:
a receiver configured to receive activation information from user equipment (UE) after the UE selects one of the plurality of micro base stations as a selected micro base station based on backhaul link information from the selected micro base station, wherein the activation information comprises an identity of the selected micro base station; and a transmitter coupled to the receiver and configured to send an activation signal to the selected micro base station based on the identity of the selected micro base station, wherein the activation signal comprises specific information and indicates a working mode of the micro base station and the activation information, and wherein the working mode of the micro base station comprises an inactive state in which the micro base station only broadcasts a discovery signal that carries the backhaul lurk information.

* * * * *